United States Patent
Norris et al.

(10) Patent No.: US 10,422,442 B2
(45) Date of Patent: Sep. 24, 2019

(54) METHOD FOR SUPPRESSION OF RESONANT VIBRATIONS IN SUBSEA PIPELINES

(71) Applicants: LORD Corporation, Cary, NC (US); Mark A. Norris, Cary, NC (US); Keith R. Ptak, Erie, PA (US); Stephen L. Williams, Cary, NC (US)

(72) Inventors: Mark A. Norris, Cary, NC (US); Keith R. Ptak, Erie, PA (US); Stephen L. Williams, Cary, NC (US)

(73) Assignee: LORD Corporation, Cary, NC (US)

(*) Notice: Subject to any disclaimer, the term of this patent is extended or adjusted under 35 U.S.C. 154(b) by 352 days.

(21) Appl. No.: 15/303,536

(22) PCT Filed: Aug. 1, 2014

(86) PCT No.: PCT/US2014/049428
§ 371 (c)(1),
(2) Date: Oct. 12, 2016

(87) PCT Pub. No.: WO2015/017792
PCT Pub. Date: Feb. 5, 2015

(65) Prior Publication Data
US 2017/0074423 A1    Mar. 16, 2017

Related U.S. Application Data

(60) Provisional application No. 61/861,189, filed on Aug. 1, 2013.

(51) Int. Cl.
*F16L 1/12*    (2006.01)
*F16F 7/104*   (2006.01)
*F16F 15/02*   (2006.01)

(52) U.S. Cl.
CPC ............ *F16L 1/123* (2013.01); *F16F 7/104* (2013.01); *F16F 15/02* (2013.01)

(58) Field of Classification Search
CPC ............ F16L 1/123; F16F 7/104; F16F 15/02
USPC ............................................. 138/106
See application file for complete search history.

(56) References Cited

U.S. PATENT DOCUMENTS 3,194,355 A * 7/1965 Jeromson, Jr. ........ F16F 9/003
                                                         138/30
5,915,508 A    6/1999 Lai

FOREIGN PATENT DOCUMENTS

| CN | 103615494 A | * | 3/2014 | |
|---|---|---|---|---|
| EP | 0 349 978 | | 1/1990 | |
| GB | 1 278 330 | | 6/1972 | |
| GB | 1278330 A | * | 6/1972 | ............ F16F 7/104 |
| SU | 1 725 003 | | 4/1992 | |

* cited by examiner

*Primary Examiner* — Craig M Schneider
*Assistant Examiner* — David R Deal
(74) *Attorney, Agent, or Firm* — Richard G. Miller

(57) ABSTRACT

A subsea pipeline system has a subsea pipe and a pipeline vibration damper (PVD) attached to the pipe.

15 Claims, 8 Drawing Sheets

METHOD FOR SUPPRESSION OF RESONANT VIBRATIONS IN SUBSEA PIPELINES

CROSS-REFERENCE TO RELATED APPLICATIONS

The present application claims priority to U.S. Provisional Patent Application No. 61/861,189 filed on Aug. 1, 2013 by Mark A. Norris, et al., entitled "METHOD FOR SUPPRESSION OF RESONANT VIBRATIONS IN SUBSEA PIPELINES," which is incorporated by reference herein as if reproduced in its entirety.

BACKGROUND

Suspended spans in subsea pipelines are typically constructed in ways to mitigate the irregularities in seabed bathymetry. A subsea pipeline span may be subjected to motions due to currents that produce a phenomenon commonly referred to as vortex induced vibration (VIV). The motions could result in high cycle fatigue damage that may potentially reduce the effective life of the pipeline. Some pipelines operating in deep waters are not affected by surface wave effects but are affected by VIVs.

Reducing the length of a pipeline span may accomplish sufficient mitigation of the VIV effects provided that the natural frequency of the pipeline span is away from the shedding frequency of the VIV so that no resonant vibration can take place. Pipeline span length reduction may be accomplished by re-routing the line along a path associated with shorter spans or by supporting the span using various methods. These span length reduction attempts are in many cases very costly or practically unfeasible.

Helical strakes are widely used to mitigate VIV as they can generally accomplish significant pipeline response reductions with no requirements for pipeline span shortening. Due to the many uncertainties involved in VIV response prediction, the engineering methodologies currently available tend to be conservative and decisions for the provision of strakes over significant extensions of pipeline lengths are not unusual. However, use of helical strakes increases project costs for procurement, fabrication, inspection, transportation, and installation, as well as detrimentally affecting the associated project schedule and risk.

One important factor inherent in pipeline VIV response is the low amount of damping of the system. Typically, the pipelines have small amounts of damping because (a) the damping capacity of the pipeline itself (structural damping) is quite limited, (b) the pipeline is in contact with the soil only at the span ends which significantly limits the soil contribution to the damping of the system, and (c) under the effects of VIV, usually referred to as "lock-in," there is no hydrodynamic damping available. Hence, the VIV response, which fundamentally is resonant-like, is not adequately mitigated by damping. This lack of damping is a major limitation, especially because resonant-like responses are very sensitive to and can be significantly reduced by increases in system damping.

SUMMARY

This disclosure provides Pipeline Vibration Dampers (PVDs) configured to mitigate subsea pipeline VIV. The PVDs reduce the pipeline response by effectively increasing the damping of pipeline systems to which the PVDs are attached. This can be potentially useful since, as noted above, the availability of damping in a typical pipeline system can be quite limited. In some embodiments, utilization of PVDs reduces the pipeline VIV response and thereby avoids excessive fatigue damage to the pipeline. The PVDs may also be used in combination with strakes, thereby reducing the extents of pipeline lengths required and/or associated with straking. Furthermore, the PVDs can be attached to the pipeline before and/or after a pipeline offshore installation campaign, and the PVDs can be used to help suppress VIV for existing pipelines. Accordingly, the use of PVDs as disclosed herein provide a practical, flexible solution to mitigating pipeline VIV.

Numerous objects and advantages of the invention will become apparent as the following detailed description of the preferred embodiments is read in conjunction with the drawings, which illustrate such embodiments.

DETAILED DESCRIPTION

Figure 1:
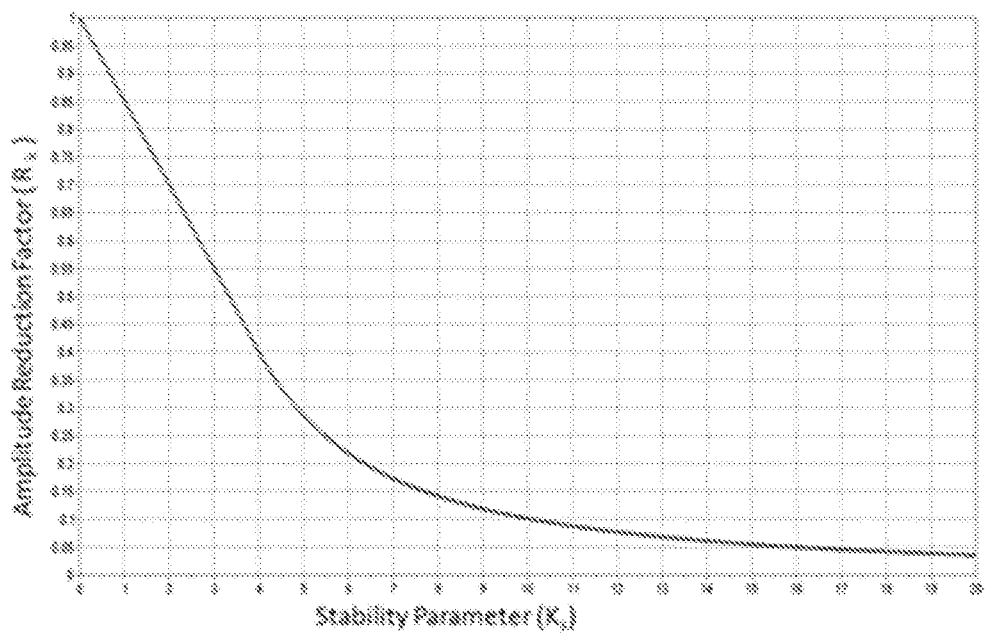
FIG. 1 is a plot indicating a reduction response amplitude versus damping.

Some PVDs disclosed herein are substantially similar to the so-called tuned vibration absorber (TVA). TVAs often comprise a reaction mass and a spring element with appropriate damping and the TVAs may be effective for reducing vibrations. TVA design and selection may comprise considering constraints of weight, damping and physical dimensions needed for a particular application.

Many TVA design configurations have been developed, and different optimal tuning rules have been studied for tonal and broadband applications. TVAs are useful for more than simply the isolation of machinery at the frequency of a rotating unbalance. For example, TVAs are useful for controlling the modal and forced response of complex continuous systems such as civil engineering structures including above ground pipelines. TVAs may also be referred to as tuned mass dampers, dynamic vibration absorbers, and/or auxiliary mass dampers. TVAs have been utilized to control wind-induced oscillations of pipelines above the Arctic Circle. TVAs may be placed at mid-span locations on pipeline spans between adjacent vertical supports of a pipeline. Vibrations of the pipeline result from wind-induced vortices exciting its natural vibration modes. Depending upon the wind conditions and pipeline configuration, as many as ten vibration modes or more of a pipeline span can be excited, and potentially greater numbers in subsea applications. Although the amplitudes of vibration are relatively small, the accumulation of vibration cycles can cause fatigue at the pipeline joints and/or other pipeline components and/or features. In some cases, by adding a PVD to a pipeline system, pipeline system damping is increased ameliorates the motion of the pipeline.

In the case of subsea VIV, the dynamic motions induced by VIV can be significantly larger than those above ground due to wind-induced vibration. Accordingly, this disclosure contemplates providing PVDs, TVAs, tuned mass dampers, dynamic vibration absorbers, and/or auxiliary mass dampers configured to increase damping of a subsea pipeline to reduce subsea current induced VIV. The deep-water subsea pipeline environment is considered to be more challenging than the above ground pipeline environment because of various factors, including accessibility to deep-water pipeline locations and the fact that water is denser than air with the associated implications on VIV and PVD performance. For example, in some embodiments disclosed herein, PVDs are disposed within inside a small pressure vessel to avoid fluid-structure interaction between the PVD and the water and ensure PVD performance. In some embodiments, an adjustable location or tunable mass and a torsional elastomeric spring may be disposed within the pressure vessel so that the PVD contents within the pressure vessel may apply a dynamic force that mitigates the VIV induced motion of the subsea pipeline to which the pressure vessel is attached.

The pipeline fatigue-producing stress range for cross-flow VIV is given by $$S_{cf} = 2A_{cf}(A_z/D)R_k\gamma_s \quad \text{Equation 1}$$

where $A_{cf}$ is the unit-diameter modal stress amplitude, $A_z/D$ is the reference normalized pipeline cross-flow VIV response which is a function of the reduced velocity, D is the pipeline outside diameter including any external coating, $\gamma_s$ is a safety factor, and the amplification reduction factor $R_k$ is given by $$R_k = \begin{cases} 1 - 0.15 K_s & \text{for } K_s \leq 4 \\ 3.2 K_s^{-1.5} & \text{for } K_s \geq 4 \end{cases} \quad \text{Equation 2}$$

in which $K_s$, referred to as the stability parameter, is defined by $$K_s = \frac{4\pi m_e \zeta_T}{\rho D^2} \quad \text{Equation 3}$$

where $m_e$ is the effective mass, $\zeta_T$ is the total modal damping ratio, and $\rho$ is the mass density of the sea water.

It is important to note that because the main effect of the PVDs is to increase damping, as will be demonstrated in the following section, the influence of the PVDs on the stress range $S_{cf}$ is captured through the damping parameter $\zeta_T$ involved in $K_s$ in Equation 3 and in turn in $R_k$ in Equations 1 and 2. Potential reductions in $S_{cf}$ due to increases in the damping parameter $\zeta_T$ are displayed in FIG. 1, a plot of $R_k$ against $K_s$, namely a plot of the Amplification Reduction Factor $R_k$ against the Stability Parameter $K_s$ indicating the reduction response amplitude versus damping in the structure.

Figure 2:
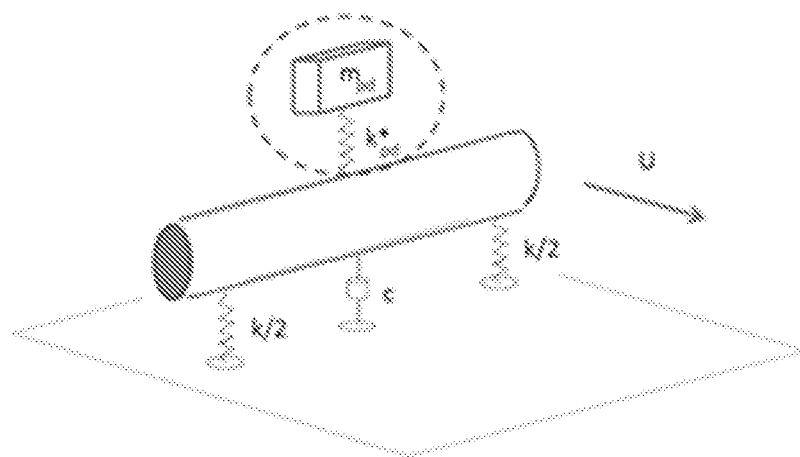
FIG. 2 is a schematic view of pipeline system comprising an attached PVD.

The PVD is a mass-spring system in which viscous-type damping is integrated with the spring element resulting in a complex-valued stiffness $k^*_{pd}$ as shown in the simplified model below. As previously indicated, the PVD is attached to the pipeline system which is also represented in FIG. 2 by the corresponding simplified model of a pipeline with a Pipeline Vibration Damper (PVD) attached with mass $m_{pd}$ and complex-valued stiffness $k^*_{pd}$. The dotted red line denotes that the PVD is enclosed in a pressure vessel such that its mass motion is only affected by the motion of the pipeline, without influences from subsea water currents or interactions with the fluid.

The quantity $k^*_{pd}$ may be referred to as the complex-valued stiffness of the PVD because it accounts for both the resistance of the spring element and its inherent viscous damping. The complex-valued stiffness is given by $$k^*_{pd} = k_{pd}(1 + i2\zeta_{pd}) \quad \text{Equation 4}$$

where $k_{pd}$ is the spring element stiffness and $\zeta_{pd}$ is the associated viscous damping ratio.

The transmissibility T of the PVD, which is the ratio of the response of the PVD mass given a unit amplitude displacement at its base with varying frequency $\omega$, can be expressed as $$T = k^*_{pd}/(k^*_{pd} - m_{pd}\omega^2) \quad \text{Equation 5}$$

where $m_{pd}$ is the mass of the PVD, $\omega$ is the frequency of oscillation when the PVD is excited by a displacement at its attachment point to the primary structure (in this case the pipeline). The force applied by the PVD on the pipeline is given by, $$F_{pd} = -m_{pd}\omega^2 T x' \quad \text{Equation 6}$$

where $x'$ is the displacement of the pipeline at the point of attachment of the PVD, and the PVD can move to damp the response at frequency $\omega$. At the undamped resonance of the PVD, $\omega_{pd}$, the PVD forcing on the pipeline is found using Equations 4-6, (with the undamped PVD natural frequency $$\omega_{pd} = \sqrt{\frac{k_{pd}}{m_{pd}}}),$$

and has the expression $$F_{pd} = m_{pd}\omega_{pd}^2(1 + 2i\zeta_{pd})/(2i\zeta_{pd})x' \quad \text{Equation 7}$$

with small values of $\zeta_{pd}$ (such as less than 0.2), Equation 7 can be approximated by $$F_{pd} = -i\, m_{pd}\omega_{pd}^2/(2\zeta_{pd})x' \quad \text{Equation 8}$$

Figure 3:
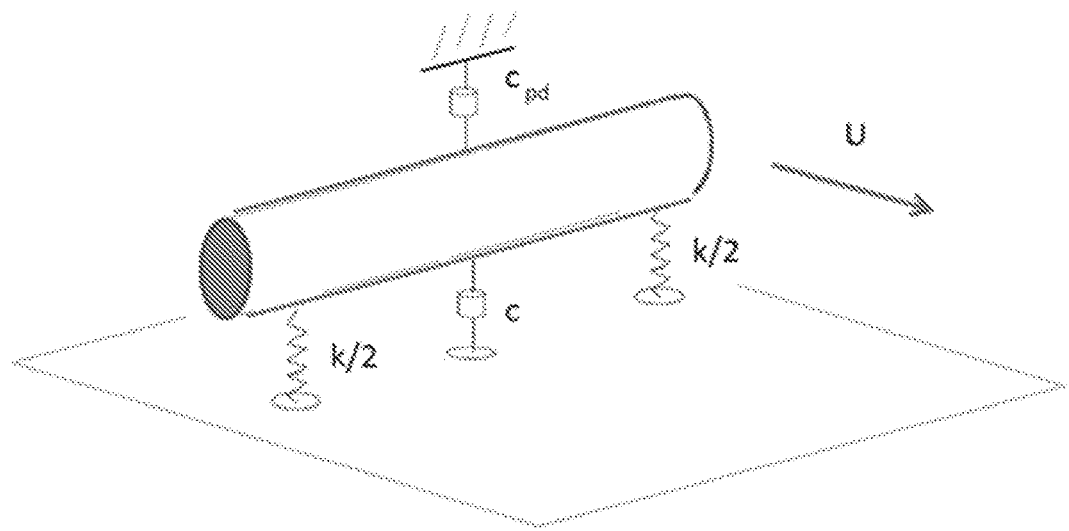
FIG. 3 is a schematic model of a pipeline system.

In Equation 8, when the PVD is operating close to its resonance, that the forcing $f_{pd}$ on the pipeline is in quadrature with the displacement $x'$, which means that it acts as an ideal dashpot where the damping of PVD is given by $$c_{pd} = m_{pd}\omega_{pd}/(2\zeta_{pd}) = 2\pi m_{pd} f_{pd}/(2\zeta_{pd}) \quad \text{Equation 9}$$

where $f_{pd}$ is the natural frequency in cycles per second for the PVD. The PVD effective damping on the pipeline structure PVD is inversely proportional to the damping $\zeta_{pd}$ in the PVD. Additionally, when the pipeline is excited by VIV near the resonance of the PVD, the model shown above takes on the form of the model shown in FIG. 3 which shows the net effect on the pipeline when a PVD is operating near its resonance.

The damping of the PVD near its resonance is also proportional to the mass $m_{pd}$ and its resonant frequency $\omega_{pd}$. A PVD favorably tuned with natural frequency $\omega_{pd}$ has a viscous damping ratio given by $$\zeta_{pd-O} = (3\mu/[8(1+\mu)])^{1/2} \quad \text{Equation 10}$$

where $\zeta_{pd-O}$ is the "optimal damping" and $\mu$ is the mass ratio of the PVD mass m to the pipeline effective mass $m_e$ given by $$\mu = m_{pd}/m_e, m_e = m + m_a \quad \text{Equation 11}$$

The mass ratio only includes the mass of the pipeline and internals. Equation 11 shows that the PVD mass ratio is dependent on the pipeline mass m and the hydrodynamic mass $m_a$. Using Equations 10 and 11, the above tuning provides what is called the "equal-peak method", and when the PVD is tuned at the $1/(1+\mu)$ times the resonance of the pipeline, however, for VIV the hydrodynamic mass term $m_a$ is included.

Figure 4:
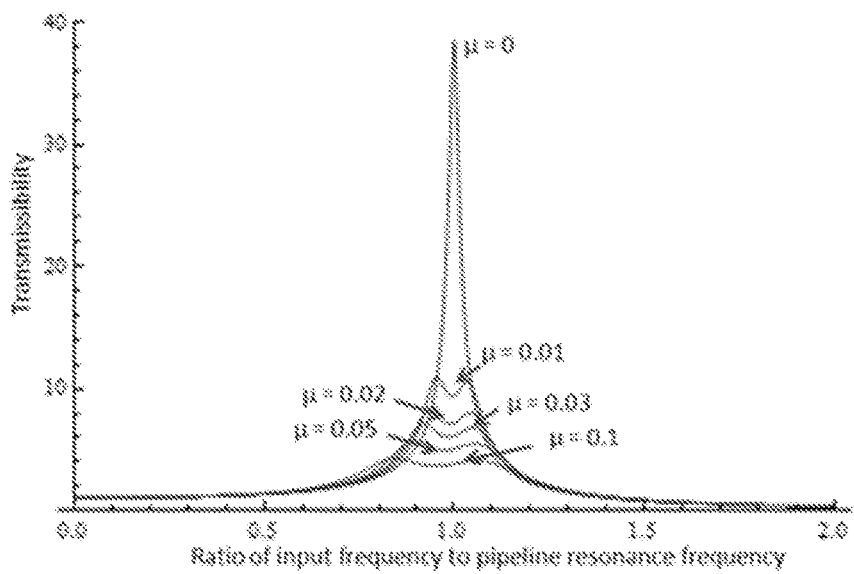
FIG. 4 is a frequency response plot.

The graph of FIG. 4 shows the effect on the system for increasing values of the mass ratio $\mu$. The graph shows the transmissibility of the system for various values of the mass ratio $\mu$ and corresponding optimal damping ratios given by Equation 10. The optimal damping places the peaks at equal amplitudes for a given mass ratio $\mu$. With the case of $\mu=0$, this corresponds to the original pipeline system with the single resonant frequency. When a PVD is attached to the pipeline, the system is a coupled dynamic system. As the mass ratio $\mu$ is increased with the corresponding optimal PVD tuning and damping (Equation 10), the response of the system decreases dramatically. In air, with a PVD weight that is $1/100$ ($\mu=0.01$) of the total effective mass of the pipe $m_e$, that the system motion reduces by a factor of nearly 4. With $\mu=0.1$, the response is reduced by a factor of 10. This would be the attenuation of the system if the pipeline where above ground.

In the following numerical example, a hybrid approach is utilized that adds a PVD to the pipeline, and compute the reduction $R_k$ for a given mass and damping of the PVD (with resonance equal to $1/(1+\mu)$ times the pipeline resonance). At that point, the frequency response is generated as shown in FIG. 4 and estimate the "effective" damping required to reduce the original pipeline resonance amplitude to coincide with the two damped resonance amplitudes of the PVD/Pipeline System shown in FIG. 4. With each quantity, Equations 2 and 3 are utilized to determine the Amplitude Reduction Ratio $R_k$ for the equivalent new resonance. The numerical example below illustrates the approach.

For the numerical example, a simply supported pipe section of length 130 feet where only the first mode is participating in the response is considered. Table 1 below provides the physical properties of the example. The example includes the hydrodynamic loading of the sea water, but does not include wave effects as it is assume that the pipe is operating on the seabed in deep water. The example places a PVD along the center of the pipe section, where the first modal deflection is the largest. Only the first mode of the pipeline is considered, and hence with a PVD attached at mid-span, the coupled system can be represented by a two degree-of-freedom system.

Now, consider the maximum displacement amplitudes of the two new resonances utilizing the PVD on the pipeline as shown in FIG. 4 above. Note that increasing values of $\mu$ with optimal damping given by Equation 10 reduces the maximum amplitude of the response of the two resonances.

Figure 5:
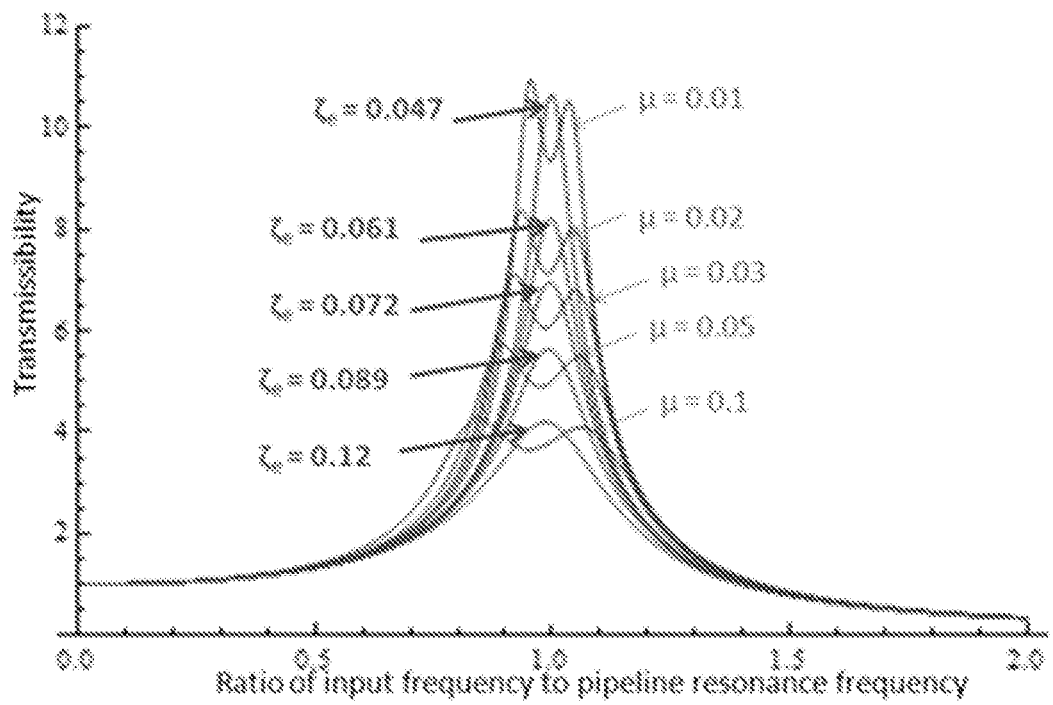
FIG. 5 is a plot showing effective viscous damping in a pipeline system.

Since VIV is a lock-in type phenomenon, only a single resonant frequency is needed to drive the structural response. The maximum amplitude the response of the pipeline is driven by the damping in each of the resonances in the system. In order to estimate what the new system damping is utilizing the PVD, an "effective" viscous damping $\zeta_c$ for the coupled system that produces the equivalent maximum displacement is developed by estimating what viscous damping the original system needs to have in order to provide the same reduction in the amplitude of response provided by the PVD. FIG. 5 shows the "effective" viscous damping in the original pipeline for the three $\mu$ values that provides maximum displacements equivalent to the two peaks generated in the coupled PVD/Pipeline System. This "effective" damping is used in estimating the $K_s$ and $R_k$ values from Equations 8 and 10, respectively. In fact, Equation 3 becomes $$K_s = \frac{4\pi m_e \zeta_e}{\rho D^2} \quad \text{Equation 12}$$

where $\zeta_e$ denotes the effective viscous damping extracted from FIG. 5 for each of the values of the mass ratio $\mu$.

TABLE 1

| Physical Properties used in the Numerical Example | |
|---|---|
| Pipe Length (Simply Supported) | 130 feet |
| Pipe outer diameter | 10.75 inches |
| Pipe thickness | 1 inch |
| Pipe Coating (Insulation) thickness | 2 inches |
| Pipe mass density | 15.2 slugs/ft^3 |
| Pipe weight per cubic foot | 490 lbs/ft^3 |
| Pipe Coating mass density | 1.86 slugs/ft^3 |
| Pipe Coating weight per cubic foot | 60 lbs/ft^3 |
| Pipe Flow (Oil) mass density | 1.71 slugs/ft^3 |
| Weight of Oil per cubic foot | 55 lbs/ft^3 |
| Total Weight of Pipe with coating | 17,889 lbs |
| Total Weight of Pipe without coating | 13,550 lbs |
| Seawater density | 1.99 slugs/ft^3 |
| Seawater weight per cubic foot | 64 lbs/ft^3 |
| Steel Pipe Modulus of Elasticity (E) | 29.5 Mpsi = 4.25 × 10^9 lb/ft^2 |
| Pipeline fundamental frequency | 0.298 Hz |
| Current Velocity | 0.4 meter/sec = 1.312 ft/sec |
| Viscous Damping Ratio of pipeline | 0.003 |
| Viscous Damping Ratio of Seafloor | 0.01 |
| Total Viscous Damping Ratio of System | 0.013 |

FIG. 5 shows the effective viscous damping in the pipeline that provides the same maximum amplitude of response for varying the three shown mass ratios ($\mu$). The frequency ratio is the ratio of the PVD/Pipeline System excitation frequency to the natural frequency of the pipeline. Also, note that the Transmissibility of the Pipeline without the PVD ($\mu=0$) is not shown as is depicted in FIG. 4. Note that the PVD with $\mu=0.01$ generates an effective viscous damping of $\zeta_e=0.047$, which is much greater than the damping in the original pipeline system ($\zeta=0.013$).

Figure 6:
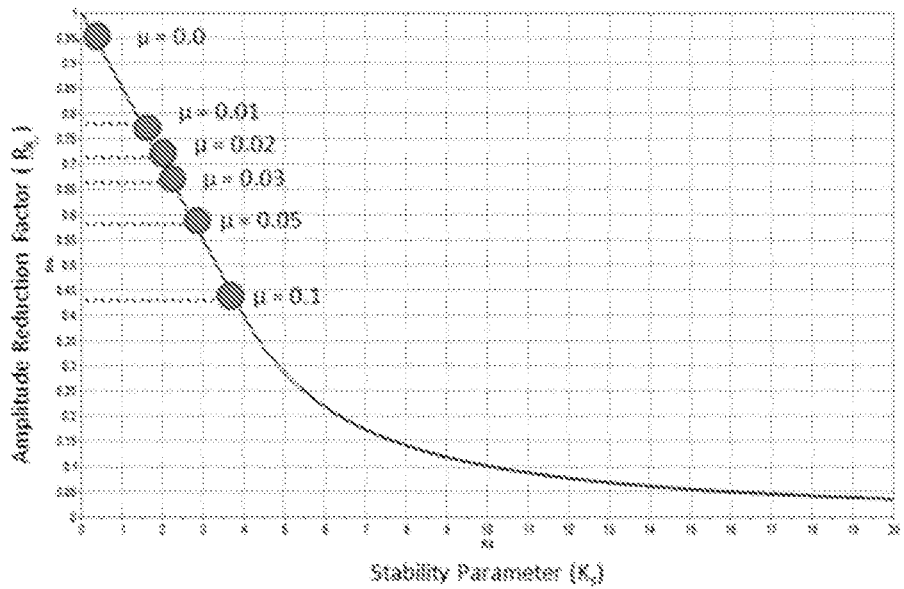
FIG. 6 is a plot showing amplitude reduction ratio decreasing with increasing values of PVD mass.

From FIG. 5 and using Equations 2 and 12, the Amplitude reduction ratio as a function of the Dynamic Stability Parameter $K_s$ can be plotted as shown in FIG. 6. FIG. 6 shows that the Amplitude reduction ratio $R_k$ decreases with increasing values of the PVD mass. Note that a PVD of mass ratio $\mu=0.1$, that the Amplitude reduction ratio is >50%. Hence, the amplitude in reduction in air using PVDs is greater than compared with the reduction amplitude in water. FIG. 6 shows the Plot of the Amplification Reduction Factor $R_k$ against the Stability Parameter $K_s$ indicating the reduction of amplitude versus damping in the structure. Further indicated is the decrease in $R_k$ with increasing PVD mass. For example, a 5% mass ratio ($\mu$) provides an Amplification Reduction Factor of 0.58, indicating 40% reduction compared to the no PVD ($\mu=0$). FIG. 6 shows that original system (with damping at $\zeta=0.013$) has an Amplitude reduction factor of 0.94. Table 2 below shows the Reduction ratios and corresponding mass ratios from FIG. 6.

Table 2 shows the Amplification Reduction Factors Rk utilizing PVDs of various mass. For each PVD case, the effective viscous damping of the system is obtained from FIG. 6. In order to obtain a 50% reduction in the amplification factor due to VIV, a mass ratio of μ=0.1 would be needed. Additionally, the viscous damping factor (from Equation 10) would be $\zeta_{pd\text{-}O}$=0.18, which is not uncommon for an above ground pipeline damper. Additionally, for the 50% reduction case, the weight required by the moving mass of the PVD would be approximately 3000 $lb_f$ compared to the total mass of the pipeline (including insulation coating) which is 18,000 $lb_f$.

TABLE 2

Amplification Reduction Results utilizing PVDs of Various Mass

| Mass Ratio μ | $R_k$ | Viscous Damping $\zeta_e$ | Amplitude Reduction due to PVD |
|---|---|---|---|
| 0.0 (no PVD) | 0.94 | $\zeta_e$ = 0.013 | — |
| 0.01 | 0.78 | $\zeta_e$ = 0.047 | 17% |
| 0.02 | 0.72 | $\zeta_e$ = 0.061 | 24% |
| 0.03 | 0.67 | $\zeta_e$ = 0.072 | 29% |
| 0.05 | 0.59 | $\zeta_e$ = 0.089 | 37% |
| 0.1 | 0.45 | $\zeta_e$ = 0.120 | 52% |

While the above analysis and numerical example have focused on cross-flow VIV, it is recognized that in-line or longitudinal VIV can occur under certain conditions. In general, the in-line VIV stress range tends to be much smaller than that produced by the cross-flow VIV. However, in-line VIV may result from current velocities which can be lower than those that may produce cross-flow VIV. These lower current velocities tend to have a relatively high probability of occurrence. The concepts and methodologies involved in using PVD devices to mitigate cross-flow VIV as explained above also apply to the mitigation of in-line VIV by employing such devices.

Figure 7:
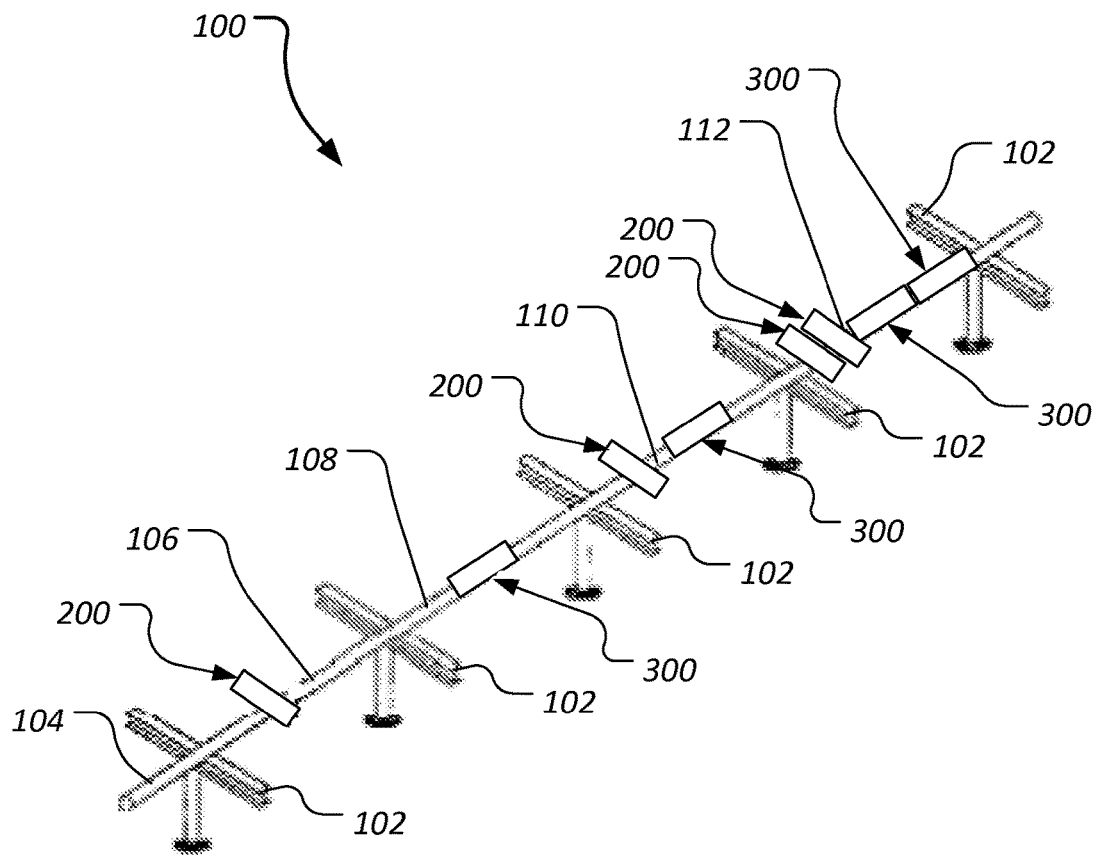
FIG. 7 is an oblique schematic view of a pipeline system according to an embodiment of the disclosure.

Referring now to FIG. 7, an oblique schematic view of a pipeline system 100 according to an embodiment of the disclosure is shown. Pipeline system 100 generally comprises a plurality of vertical supports 102 disposed in a subsea environment and configured to support a pipeline 104. In this embodiment, the pipeline 104 generally comprises spans 106, 108, 110, 112 of pipe that comprise portions of the pipeline 104 extending between adjacent vertical supports. The pipeline system 100 further comprises transverse PVDs 200 and longitudinal PVDs 300. The transverse PVDs 200 are generally configured for attachment to the pipeline 104 to mitigate cross-flow VIV while the longitudinal PVDs 300 are generally configured for attachment to the pipeline 104 to mitigate in-line or longitudinal VIV. Span 106 comprises a single transverse PVD 200, span 108 comprises a single longitudinal PVD 300. Span 108 comprises one of each of a transverse PVD 200 and a longitudinal PVD 300. Span 110 comprises multiple transverse PVDs 200 and multiple PVDs 300. FIG. 7 illustrates that any number and/or combination of types of PVDs 200, 300 may be associated with and/or attached to any span of a subsea pipeline. While the PVDs 200, 300 are shown as being generally mounted on top of the pipeline 104, in alternative embodiments, the PVDs 200, 300 may be mounted underneath the pipeline 104 and/or on a side of the pipeline 104. While pipeline 104 is shown as being generally parallel to the sea floor, in alternative embodiments, a pipeline comprising attached PVDs 200, 300 may extend substantially vertically and/or in any other direction relative to the sea floor.

Figure 8:
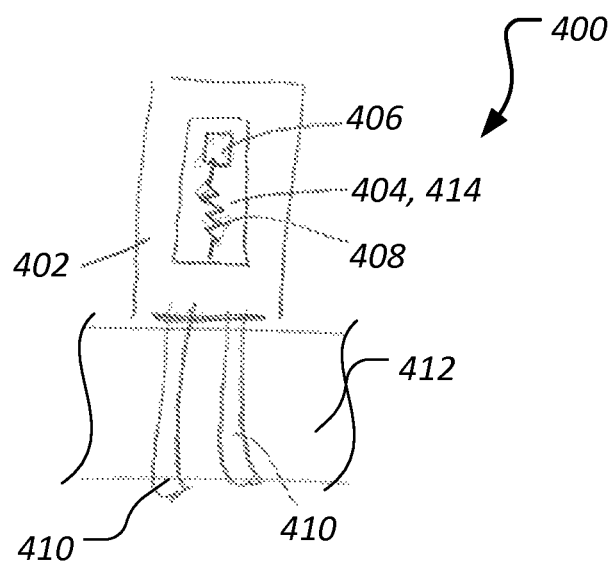
FIGS. 8-16 each show different embodiments of PVD mounting components.

Referring now to a FIG. 8, a cutaway view of an oil PVD 400 is shown. The oil PVD 400 generally comprises a housing 402 configured to provide an interior space 404 suited for housing a mass 406 that is coupled to the housing 402 via a spring 408. The PVD 400 further comprises at least one connector 410 configured to connect the housing 402 to a pipe span 412. In some embodiments, the interior space 404 is substantially filled with oil 414 or any other fluid suitable for providing viscous damping to movement of the mass 406 and/or the spring 408. In this embodiment, the connectors 410 comprise straps.

Figure 9:
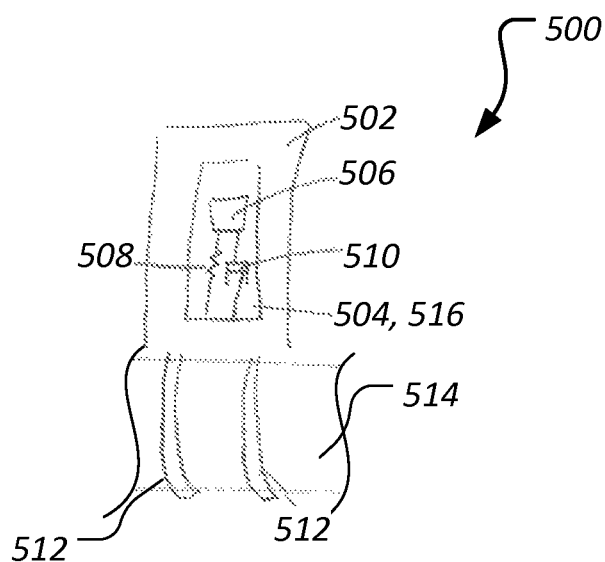

Referring now to a FIG. 9, a cutaway view of an air PVD 500 is shown. The air PVD 500 generally comprises a housing 502 configured to provide an interior space 504 suited for housing a mass 506 that is coupled to the housing 502 via both a spring 508 and a damper 510. The PVD 500 further comprises at least one connector 512 configured to connect the housing 502 to a pipe span 514. In some embodiments, the interior space 504 is substantially filled with air 516 or any other fluid that does not provide significant viscous damping to movement of the mass 506 and/or the spring 508. In this embodiment, viscous damping is provided by the damper 510. In this embodiment, the connectors 512 comprise straps.

With regard to PVDs 400, 500, the housings 402, 502, respectively are configured to isolate the interior spaces 404, 504, respectively, and their contents from corrosion, effects of water dynamics and damping, and sealife encroachment. The housings 402, 502 may generally comprises spherical, rectangular, cylindrical, hemispherical, and/or any other suitable geometric shape and/or profile. In some embodiments, the air PVD 500 may require a relatively more structurally robust housing as compared to a housing for an oil PVD 400. In some embodiments, PVDs 400, 500 may be designed to be buoyancy neutral, positive, or negative, as desired. In some embodiments, the PVDs 400, 500 may comprise one or more of the vibration absorbers disclosed in U.S. Pat. No. 6,397,988 B1 issued to Keith R. Ptak on Jun. 4, 2002.

Figure 10:
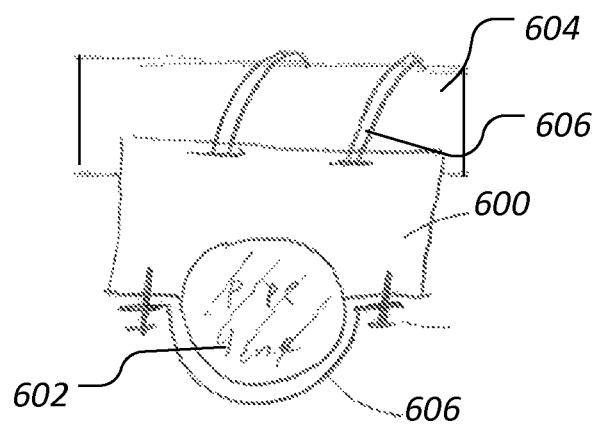

Referring now to FIG. 10, a transverse single mount fixture 600 is shown as an intermediary mounting element disposed between a pipeline 602 and a cylindrical PVD housing 604. The fixture 600 is attached to each of the pipeline 602 and the housing 604 using straps 606.

Figure 11:
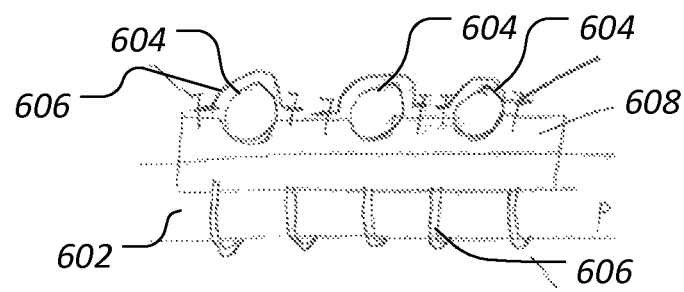

Referring now to FIG. 11, a transverse multiple mount fixture 608 is shown as an intermediary mounting element disposed between a pipeline 602 and a plurality of cylindrical PVD housings 604. The fixture 608 is attached to each of the pipeline 602 and the housings 604 using straps 606.

Figure 12:
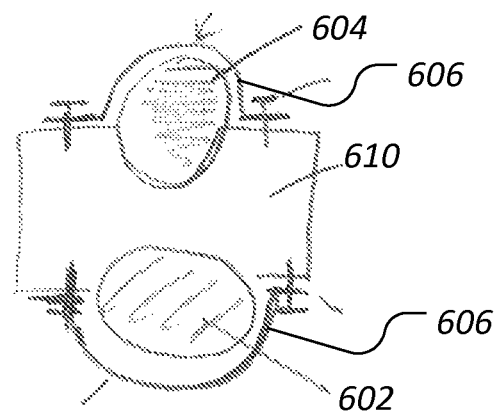

Referring now to FIG. 12, a longitudinal single mount fixture 610 is shown as an intermediary mounting element disposed between a pipeline 602 and a cylindrical PVD housing 604. The fixture 610 is attached to each of the pipeline 602 and the housing 604 using straps 606.

Figure 13:
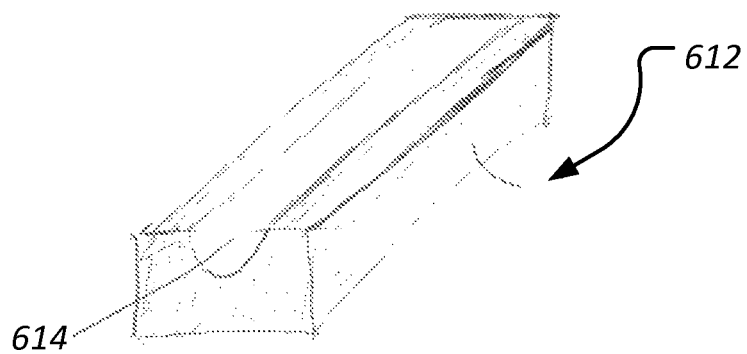

Referring now to FIG. 13, a mounting fixture 612 is shown which may be used, along with appropriate fasteners such as bolts, instead of straps 606. In other words, the channel 614 of fixture 612 may be suitable for receiving a pipeline or a cylindrical PVD housing and bolts or other fasteners may be utilized to join secure the fixture 612 relative to another fixture, strap, pipeline, and/or PVD housing.

Figure 14:
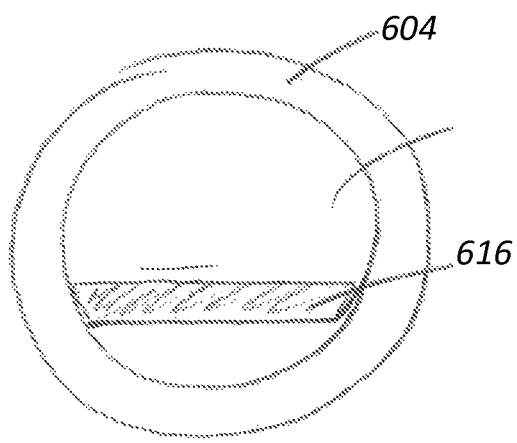

Referring now to FIG. 14, a cutaway view of a cylindrical PVD housing 604 is shown. In some embodiments. A cylindrical or other non-flat interior surface of a PVD housing may have an attached support plate 616 or other internal structure configured to provide easier mounting of springs, masses and/or related internal hardware components.

Figure 15:
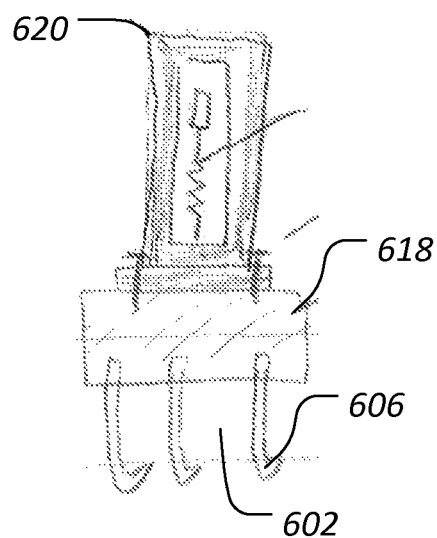

Referring now to FIG. 15, a single mount fixture 618 is shown as an intermediary mounting element disposed between a pipeline 602 and a linear type end mounted PVD housing 620. The fixture 618 is attached to the pipeline 602 using straps 606.

Figure 16:
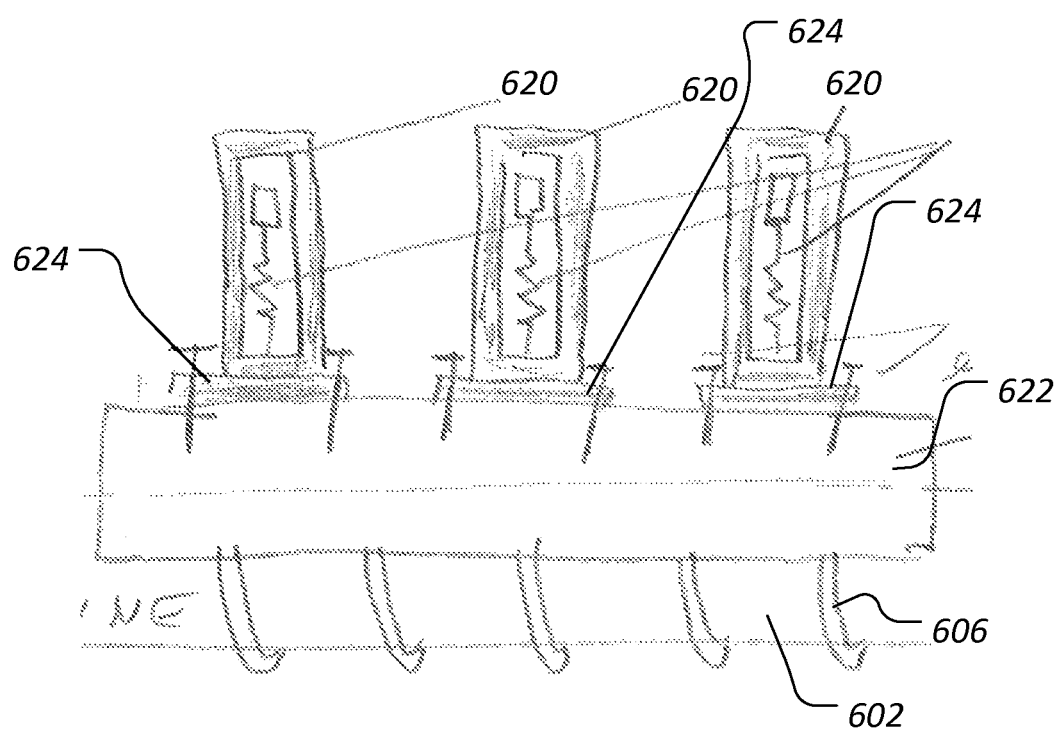

Referring now to FIG. 16, a multiple mount fixture 622 is shown as an intermediary mounting element disposed between a pipeline 602 and multiple linear type end mounted PVD housings 620. The fixture 622 is attached to the pipeline 602 using straps 606. Each of the housings 620 further comprise flanges 624 joined to the fixture 622 using fasteners such as bolts.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A subsea pipeline system, comprising:
a subsea pipe; and
a pipeline vibration damper (PVD) attached to the subsea pipe and contained within a pressure vessel, wherein the PVD includes an adjustable location and/or a tunable mass and the PVD includes an elastomeric spring, wherein the adjustable location and/or a tunable mass and the elastomeric spring are disposed within the pressure vessel, wherein the subsea pipeline system is subjected to vortex induced vibrations (VIV), wherein for a cross-flow VIV situation the PVD has an amplification reduction between about 17% to about 52% for a mass ratio μ between about 0.01 and about 0.1.

2. The subsea pipeline system of claim 1, further comprising a fluid tight housing configured to house the PVD.

3. The subsea pipeline system of claim 2, wherein the fluid tight housing comprises a compressible fluid disposed therein.

4. The subsea pipeline system of claim 2, wherein the fluid tight housing comprises an incompressible fluid disposed therein.

5. The subsea pipeline system of claim 1, further comprising a plurality of PVDs.

6. The subsea pipeline system of claim 5, further comprising at least one PVD attached to the subsea pipe to react cross-flow vortex induced vibrations (VIV).

7. The subsea pipeline system of claim 5, further comprising at least one PVD attached to the subsea pipe to react in-line vortex induced vibrations (VIV).

8. The subsea pipeline system of claim 5, further comprising at least one PVD attached to the subsea pipe to react in-line vortex induced vibrations (VIV) and at least one PVD to react cross-flow VIV.

9. A method of reducing pipeline system vibrations, comprising:
providing a subsea pipe; and
attaching a pipeline vibration damper (PVD) to the subsea pipe, the PVD contained within a pressure vessel, wherein the PVD includes an adjustable location and/or a tunable mass and the PVD includes an elastomeric spring, wherein the adjustable location and/or a tunable mass and the elastomeric spring are disposed within the pressure vessel; and
tuning the PVD, wherein the tuning comprises changing a location of the tunable mass of the PVD.

10. The method of claim 9, further comprising segregating the PVD from sea water.

11. The method of claim 9, further comprising subjecting the PVD attached to the subsea pipeline system to vortex induced vibrations (VIV), wherein for a cross-flow VIV situation the PVD has an amplification reduction between about 17% to about 52% for a mass ratio μ between about 0.01 and about 0.1.

12. The subsea pipeline system of claim 9, further comprising the step of attaching a plurality of PVDs.

13. The subsea pipeline system of claim 12, further comprising the step of attaching at least one PVD to the subsea pipe to react cross-flow vortex induced vibrations (VIV).

14. The subsea pipeline system of claim 12, further comprising the step of attaching at least one PVD to the subsea pipe to react in-line vortex induced vibrations (VIV).

15. The subsea pipeline system of claim 12, further comprising the step of attaching at least one PVD to the subsea pipe to react in-line vortex induced vibrations (VIV) and attaching at least one PVD to react cross-flow VIV.

* * * * *